United States Patent
Rozario et al.

(10) Patent No.: US 7,249,584 B2
(45) Date of Patent: Jul. 31, 2007

(54) IMPULSE CHARGING CONTROL TO EXTEND DISPLACEMENT ON DEMAND RANGE

(75) Inventors: Frederick J. Rozario, Fenton, MI (US); Mike M. Mc Donald, Macomb, MI (US); William C. Albertson, Clinton Township, MI (US); Ko-Jen Wu, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 36 days.

(21) Appl. No.: 11/238,726

(22) Filed: Sep. 29, 2005

(65) Prior Publication Data

US 2007/0068486 A1    Mar. 29, 2007

(51) Int. Cl.
*F02D 13/06* (2006.01)

(52) U.S. Cl. .................................................. 123/198 F

(58) Field of Classification Search ............ 123/198 F, 123/481
See application file for complete search history.

(56) References Cited

U.S. PATENT DOCUMENTS 6,874,463 B1 *  4/2005  Bolander et al. ........ 123/198 F
7,019,414 B2 *  3/2006  Albertson et al. ........ 290/40 B

* cited by examiner

*Primary Examiner*—Stephen K. Cronin
*Assistant Examiner*—Hyder Ali

(57) ABSTRACT

An engine control system for controlling engine operation in activated and deactivated modes in a displacement on demand (DOD) engine includes an impulse charging device that is disposed upstream of an intake port of a cylinder of the DOD engine and that is operable to regulate air flow into the cylinder. A first module initiates impulse charging to regulate air flow into the cylinder when a desired engine torque output nears a first threshold engine torque output during engine operation in the deactivated mode.

15 Claims, 6 Drawing Sheets

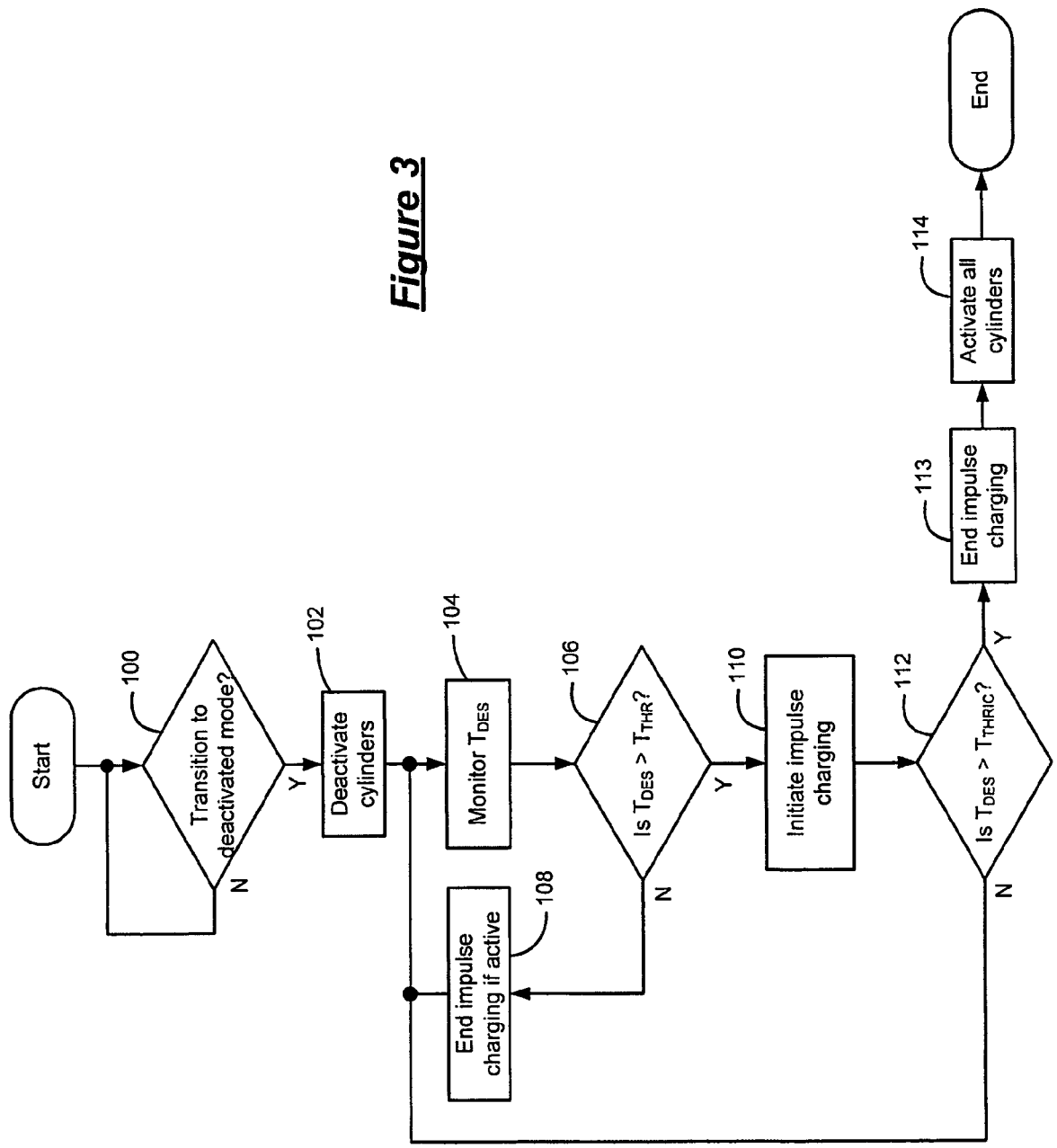

IMPULSE CHARGING CONTROL TO EXTEND DISPLACEMENT ON DEMAND RANGE

FIELD OF THE INVENTION

The present invention relates to internal combustion engines, and more particularly to engine control systems that control engine operation in a displacement on demand engine.

BACKGROUND OF THE INVENTION

Some internal combustion engines include engine control systems that deactivate cylinders under low load situations. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

In the deactivated mode, there are fewer cylinders operating. As a result, there is less drive torque available to drive the vehicle driveline and accessories (e.g., alternator, coolant pump, A/C compressor). Engine efficiency, however, is increased as a result of decreased fuel consumption (i.e., no fuel supplied to the deactivated cylinders) and decreased engine pumping. Because the deactivated cylinders do not take in air, overall engine pumping losses are reduced. During typical engine operation in the deactivated mode, the engine is switched to the activated mode when the torque demand is greater than a threshold (e.g., approximately 95%) of the maximum torque available in the deactivated mode.

During the course of normal driving, there are many operating conditions just above the threshold of the deactivated mode torque limit. As a result, there are multiple occurrences of switching to the less fuel efficient activated mode. Once in the activated mode, hysteresis often delays transition back into the deactivated mode. These conditions result in missed opportunities to reduce fuel consumption.

SUMMARY OF THE INVENTION

Accordingly, the present invention provides an engine control system for controlling engine operation in activated and deactivated modes in a displacement on demand (DOD) engine. The engine control system includes an impulse charging device that is disposed upstream of an intake port of a cylinder of the DOD engine and that is operable to regulate air flow into the cylinder. A first module initiates impulse charging to regulate air flow into the cylinder when a desired engine torque output nears a first threshold engine torque output during engine operation in the deactivated mode.

In one feature, the impulse charging device inhibits air flow into the cylinder for a portion of an intake event.

In another feature, the impulse charging device includes a high-speed valve that is operable in an open position to enable air flow therethrough and a closed position to inhibit air flow therethrough.

In still other features, the engine control system further includes a second module that switches engine operation to the activated mode when the desired engine torque nears a second threshold engine torque during engine operation in the deactivated mode with impulse charging. The second module switches engine operation to the deactivated mode when the desired engine torque is below the first threshold engine torque minus a hysteresis value.

In yet another feature, the first module ceases impulse charging when the desired engine torque is below the first threshold engine torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flowchart illustrating the impulse charging control according to the present invention;

DETAILED DESCRIPTION OF THE PREFERRED EMBODIMENTS

Figure 1:
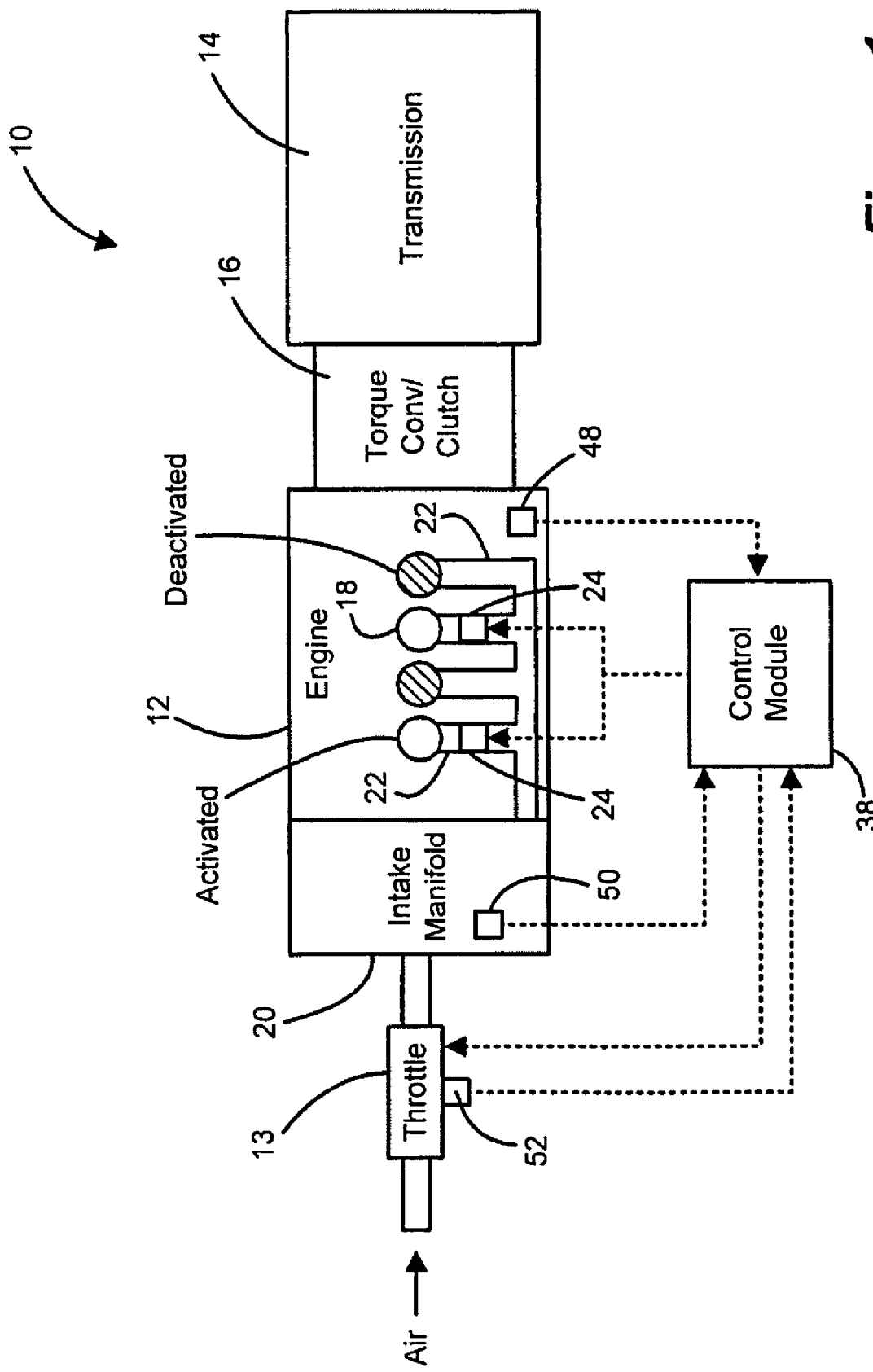
FIG. 1 is a functional block diagram illustrating an exemplary vehicle powertrain including a displacement on demand (DOD) engine system having an impulse charging system according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more of the cylinders 18 are selectively deactivated during engine operation. Although FIG. 1 depicts four cylinders (N=4), it is appreciated that the engine 12 may include additional or fewer cylinders 18. For example, engines having 4, 5, 6, 8, 10, 12 and 16 cylinders are contemplated. Air flows into the engine 12 through an intake manifold 20 is directed to the cylinders 18 through runners 22 and is combusted with fuel in the cylinders 18.

Figure 2A:
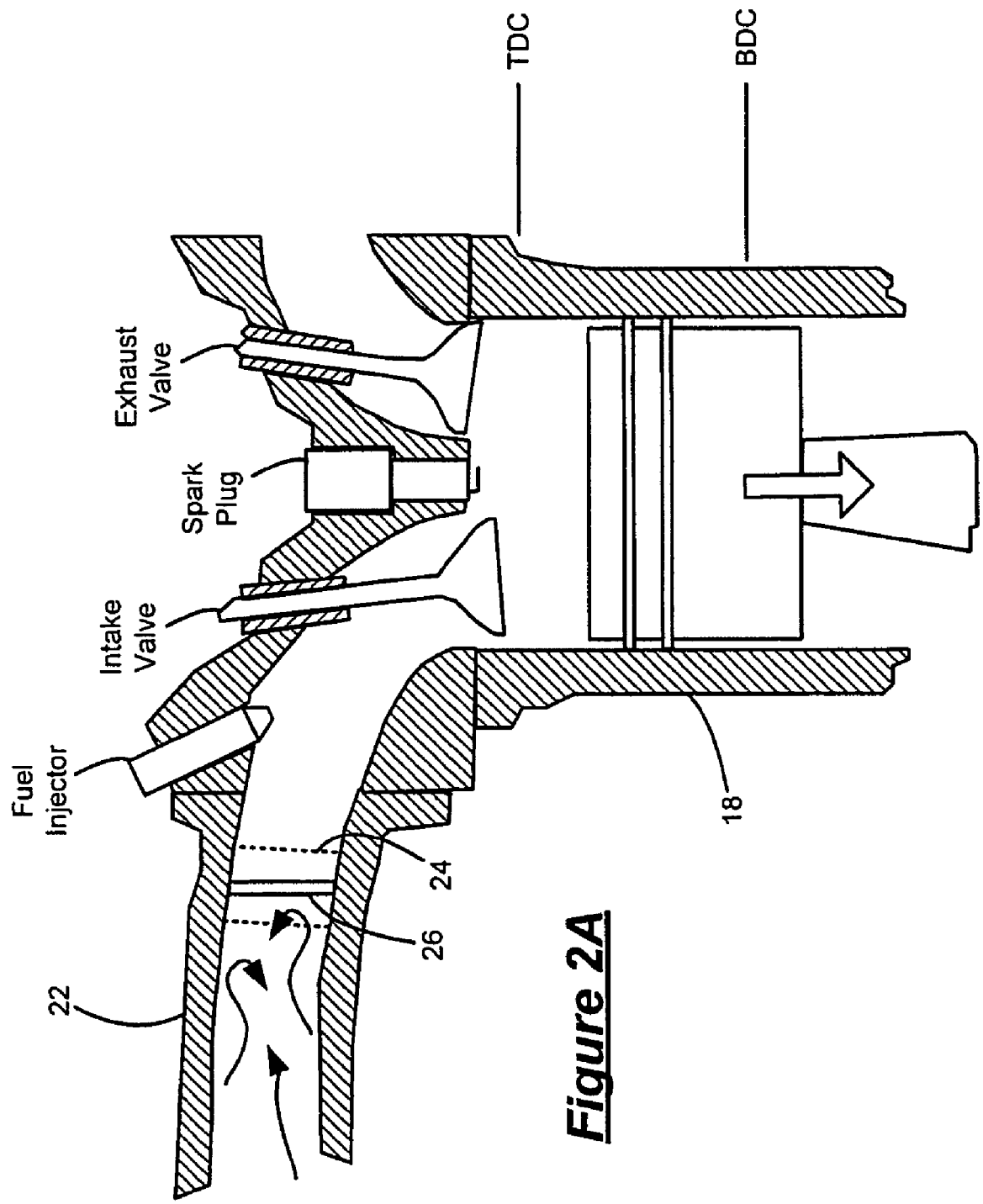
FIG. 2A is a schematic cross-section of a cylinder of the engine including an impulse charging valve in a closed position.
Figure 2B:
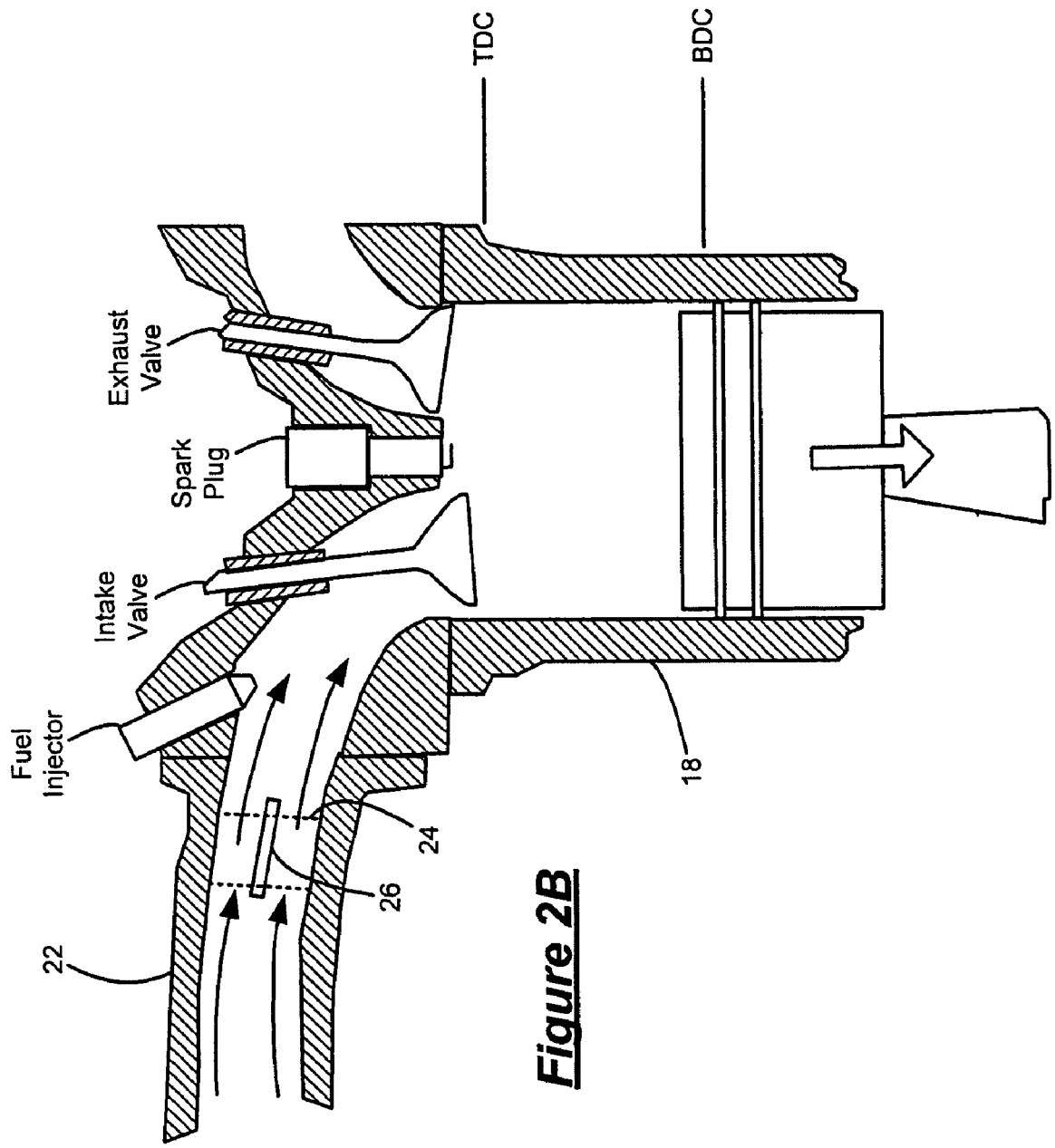
FIG. 2B is the schematic cross-section of the cylinder of the engine including the impulse charging valve in an open position.

Referring now to FIGS. 1, 2A and 2B, the engine further includes impulse charging devices 24 located within respective intake runners 22 associated with respective cylinders 18. Although two impulse charging devices 24 are illustrated, it is appreciated that more or fewer impulse charging devices 24 can be implemented. The impulse charging devices 24 selectively inhibit air flow from the intake manifold into its respective cylinder, as discussed in further detail below. More specifically, each impulse charging device 24 includes a high-speed valve 26. During normal engine operation, the valve 26 remains open and has very little effect on air intake into the cylinders 18. In an impulse charging mode, the valve 26 is closed during most of the intake event. As a result, there is a low pressure or vacuum within the cylinder 18 and along the intake runner 22 downstream of the impulse charging device 24.

The valve 26 is rapidly opened at a predetermined time towards the end of the intake event and an inrush of air produces a supercharging effect within the cylinder 18. In this manner, the air pressure above the piston is increased over a traditional intake event. The valve 26 is closed and a positive pressure wave produced by the inrush of air is captured. At the beginning of the subsequent intake event, the positive pressure wave functions to eliminate exhaust residuals. In the impulse charging mode, the torque output of the engine can be increased as much as 20% at lower engine speeds.

A control module 38 communicates with the engine 12 and various inputs and sensors as discussed herein. An engine speed sensor 48 generates a signal based on engine speed. An intake manifold absolute pressure (MAP) sensor 50 generates a signal based on a pressure of the intake manifold 20. A throttle position sensor (TPS) 52 generates a signal based on throttle position.

When light engine load occurs, the control module 38 transitions the engine 12 to the deactivated mode. In an exemplary embodiment, N/2 cylinders 18 are deactivated, although one or more cylinders may be deactivated. Upon deactivation of the selected cylinders 18, the control module 38 increases the power output of the remaining or activated cylinders 18. The inlet and exhaust ports (not shown) of the deactivated cylinders 18 are closed to reduce pumping losses.

The engine load is determined based on various engine operating parameters including, but not limited to, the intake MAP, cylinder mode, impulse charging mode and engine speed. More particularly, engine load is expressed as the percent of maximum available engine torque. For purposes of discussion, engine torque will be used in the foregoing discussion. If engine torque is below a threshold level for a given RPM, the engine load is deemed light and the engine 12 is operated in the deactivated mode. If engine torque is above the threshold level for the given RPM, the engine load is deemed heavy and the engine 12 is operated in the activated mode. An exemplary threshold level is 95% of maximum available torque ($T_{DEAC}$). The control module 38 controls the engine 12 based on the impulse charging control to maintain engine operation in the more fuel efficient regions and to extend the time during which the engine 12 operates in the deactivated mode.

The impulse charging control of the present invention regulates engine operation in the impulse charging mode concurrent to the engine operating in the deactivated mode. More particularly, there is a maximum available engine torque when operating in the deactivated mode ($T_{DEAC}$). When the torque demand on the engine ($T_{DES}$) exceeds a threshold torque ($T_{THR}$) (e.g., 90%-95% of $T_{DEAC}$), the deactivated cylinder mode engine is concurrently operated in the impulse charging mode. Impulse charging while operating in the deactivated mode provides an increased available engine torque ($T_{DEACIC}$) (i.e., $T_{DEAC} < T_{DEACIC}$). In general, a torque increase of up to approximately 20% can be achieved (e.g., $T_{DEACIC} = (1.2)T_{DEAC}$).

$T_{THR}$ correspondingly increases to provide a second threshold ($T_{THRIC}$) when operating in the concurrent deactivated and impulse charging modes. Using an exemplary value of 95%, $T_{THR}$ would be approximately equal to $0.95*T_{DEAC}$ in the deactivated mode $T_{THRIC}$ would be approximately equal to $0.95*T_{DEACIC}$ in the deactivated mode with impulse charging. Because $T_{DEACIC}$ is greater than $T_{DEAC}$, $T_{THRIC}$ in the deactivated mode with impulse charging is greater than $T_{THR}$ in the deactivated mode without impulse charging. Engine operation switches to the activated mode when the $T_{DES}$ exceeds $T_{THRIC}$. More specifically, when $T_{DEACIC}$ is insufficient to provide $T_{DES}$, engine operation is switched to the activated mode. $T_{DES}$ is determined based on driver demand (e.g., accelerator pedal position).

Referring now to FIG. 3, exemplary steps executed by the impulse charging control will be described in detail. In step 100, control determines whether to transition to the deactivated mode. If control determines not to transition to the deactivated mode, control loops back. If control determines to transition to the deactivated mode, control deactivates select cylinders 18 in step 102.

In step 104 control monitors $T_{DES}$. Control determines whether $T_{DES}$ exceeds $T_{THR}$ in step 106. If $T_{DES}$ does not exceed $T_{THR}$, control ends impulse charging if it is currently active in step 108 and loops back to step 104. If $T_{DES}$ exceeds $T_{THR}$, control initiates impulse charging in step 110. In step 112, control determines whether $T_{DES}$ exceeds $T_{THRIC}$. If $T_{DES}$ does not exceed $T_{THRIC}$, control loops back to step 104. If $T_{DES}$ exceeds $T_{THRIC}$, control ends impulse charging activity and activates all cylinders (i.e., switches to the activated mode) in steps 113, 114 and ends.

Figure 4:
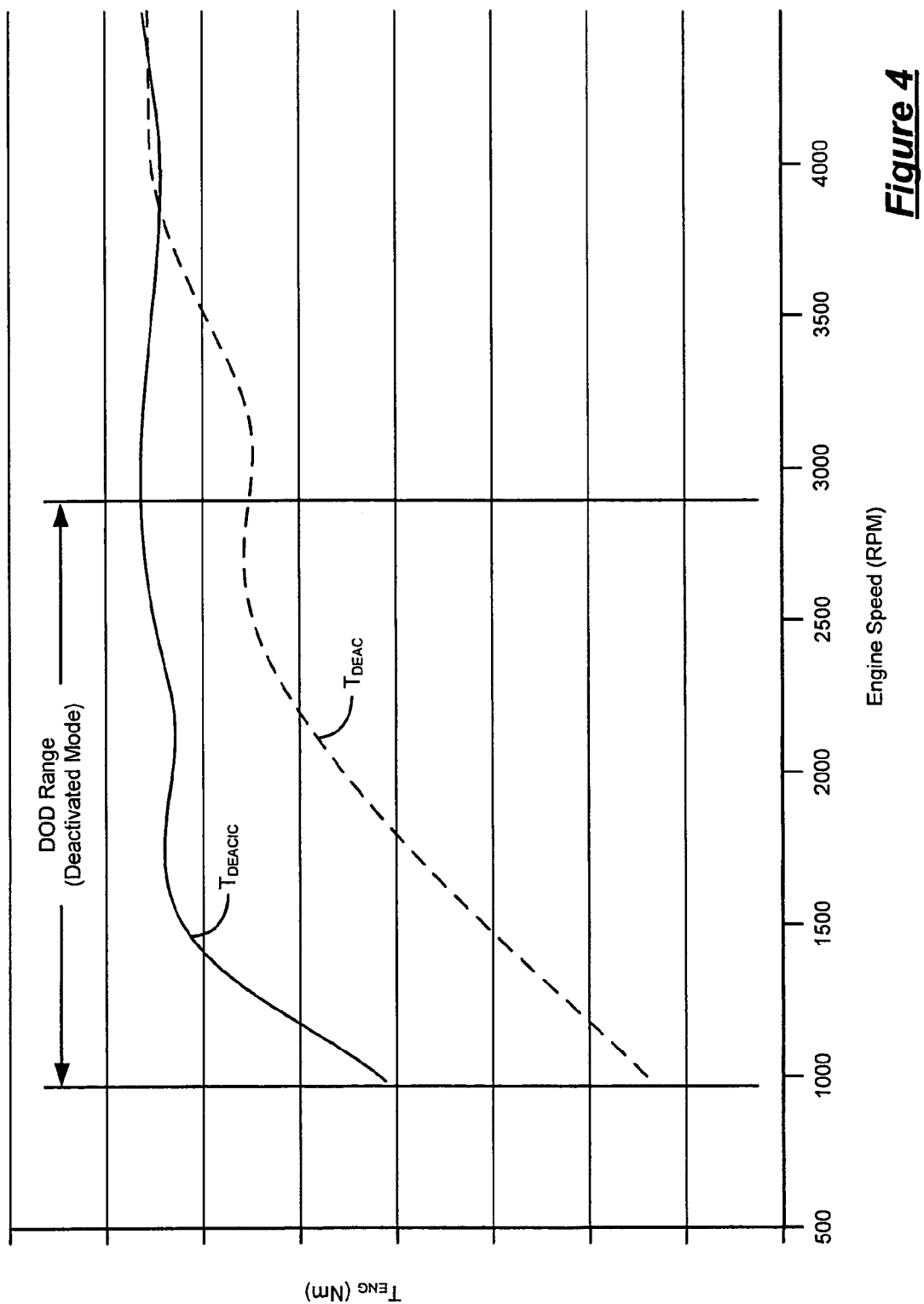
FIG. 4 is an exemplary graph illustrating torque increase achieved using the impulse charging control of the present invention.

Referring now to FIG. 4, exemplary torque curves versus engine speed are illustrated for the impulse charging control. An exemplary DOD range for the deactivated mode is defined from approximately 950 RPM to approximately 2900 RPM. $T_{DEAC}$ (in phantom) indicates the torque curve during normal engine operation in the deactivated mode. The $T_{DEACIC}$ (in solid) indicates the torque curve during engine operation in the deactivated mode with impulse charging. A significant torque increase is achieved by concurrent operation in the deactivated mode and impulse charging modes, enabling the engine to remain in the deactivated mode for an extended period.

Figure 5:
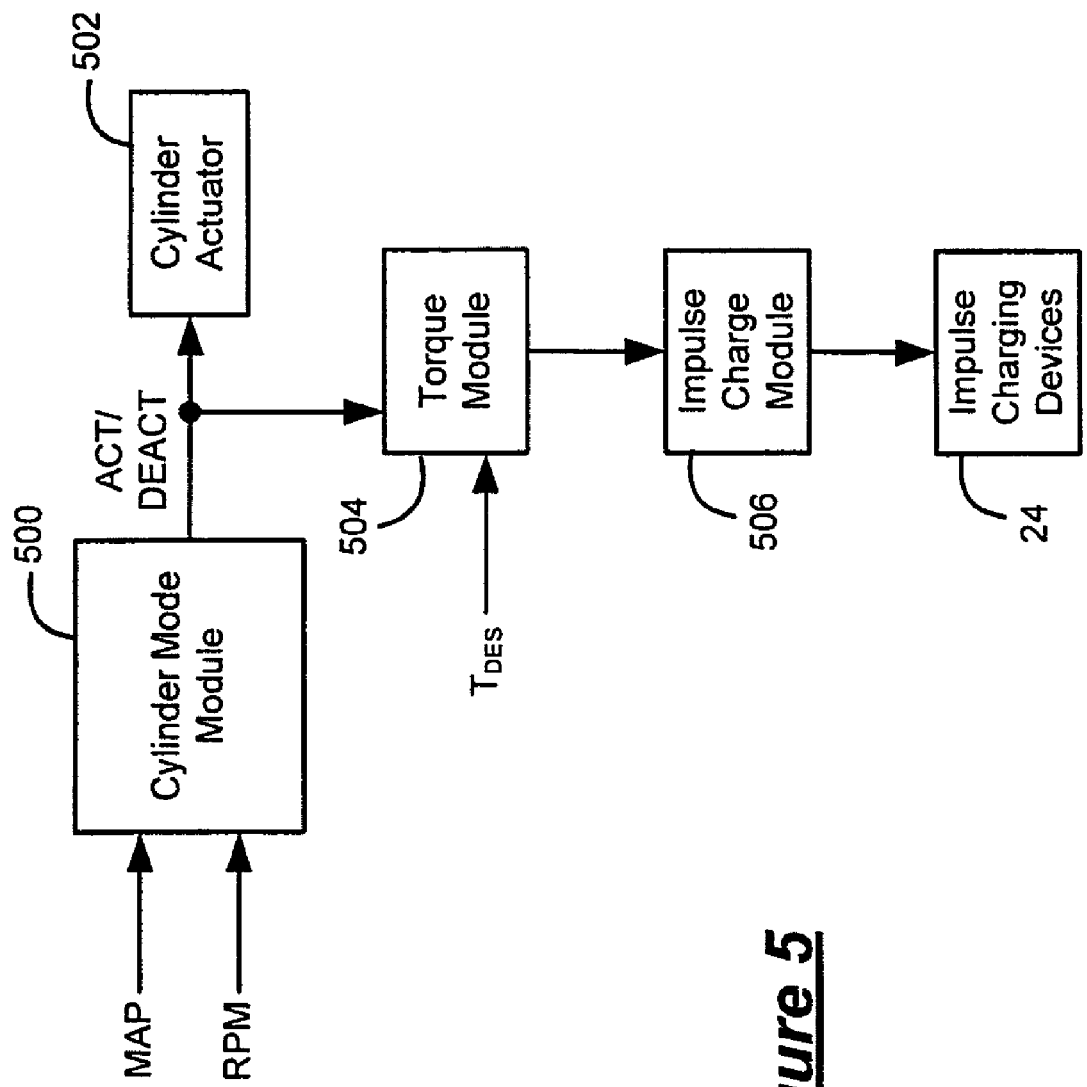
FIG. 5 is a logic diagram illustrating exemplary modules that execute the impulse control of the present invention.

Referring now to FIG. 5, the logic flow of the impulse charging control will be described in detail. A cylinder mode module 500 receives engine operating parameters including torque and RPM signals, and generates a cylinder activation or deactivation signal based thereon. The cylinder activation or deactivation signal is sent to a cylinder actuator module 502 and a torque module 504. The cylinder actuator 502 deactivates or activates selected cylinders based on the activation or deactivation signal. The torque module 504 monitors the available torque output of the engine in comparison to $T_{DES}$. The torque module 504 generates an impulse charging control signal if $T_{DES}$ is nearing $T_{THR}$. The impulse charging control signal is sent to an impulse charging module 506, which regulates operation of the impulse charging devices 24.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for controlling engine operation in activated and deactivated modes in a displacement on demand (DOD) engine, comprising:

an impulse charging device that is disposed upstream of an intake port of a cylinder of said DOD engine and that is operable to regulate air flow into said cylinder, wherein said impulse charging device inhibits air flow into said cylinder for a portion of an intake event; and a first module that initiates impulse charging to regulate air flow into said cylinder when a desired engine torque output exceeds a first threshold engine torque output during engine operation in said deactivated mode.

2. The engine control system of claim 1 wherein said impulse charging device includes a high-speed valve that is operable in an open position to enable air flow therethrough and a closed position to inhibit air flow therethrough.

3. The engine control system of claim 1 further comprising a second module that switches engine operation to said activated mode when said desired engine torque exceeds a second threshold engine torque during engine operation is said deactivated mode with impulse charging.

4. The engine control system of claim 3 wherein said second module switches engine operation to said deactivated mode when said desired engine torque is below said first threshold engine torque minus a hysteresis value.

5. The engine control system of claim 1 wherein said first module ceases impulse charging when said desired engine torque is below said first threshold engine torque.

6. A method of controlling engine operation in activated and deactivated modes in a displacement on demand (DOD) engine, comprising:

determining a desired engine torque;

comparing said desired engine torque to a first threshold engine torque; and initiating impulse charging of air into cylinders of said DOD engine when said desired engine torque exceeds said first threshold engine torque while operating in said deactivated mode, wherein said impulse charging includes inhibiting air flow into said cylinder for a portion of an intake event.

7. The method of claim 6 wherein said impulse charging implements an impulse charging device that includes a high-speed valve that is operable in an open position to enable air flow therethrough and a closed position to inhibit air flow therethrough.

8. The method of claim 6 further comprising switching engine operation to said activated mode when said desired engine torque exceeds a second threshold engine torque during engine operation in said deactivated mode with impulse charging.

9. The method of claim 8 further comprising switching engine operation to said deactivated mode when said desired engine torque is below said first threshold engine torque.

10. The method of claim 6 further comprising ceasing impulse charging when said desired engine torque is below said first threshold engine torque.

11. A method of controlling engine operation in activated and deactivated modes in a displacement on demand (DOD) engine, comprising:

determining a desired engine torque;

calculating a first threshold engine torque based on a first available engine torque in said deactivated mode;

comparing said desired engine torque to said first threshold engine torque; and initiating impulse charging of air into cylinders of said DOD engine when said desired engine torque exceeds said first threshold engine torque while operating in said deactivated mode, wherein said impulse charging includes inhibiting air flow into said cylinder for a portion of an intake event.

12. The method of claim 11 wherein said impulse charging implements an impulse charging device that includes a high-speed valve that is operable in an open position to enable air flow therethrough and a closed position to inhibit air flow therethrough.

13. The method of claim 11 further comprising:

calculating a second threshold engine torque based on a second available engine torque in said deactivated mode with impulse charging; and switching engine operation to said activated mode when said desired engine torque exceeds said second threshold engine torque.

14. The method of claim 13 further comprising switching engine operation to said deactivated mode when said desired engine torque is below said first threshold engine torque.

15. The method of claim 11 further comprising ceasing impulse charging when said desired engine torque is below said first threshold engine torque.

* * * * *